July 27, 1965   H. BOUTILLON   3,197,134
TRANSMISSION MECHANISM AND ITS APPLICATIONS
Filed April 24, 1962   4 Sheets-Sheet 1

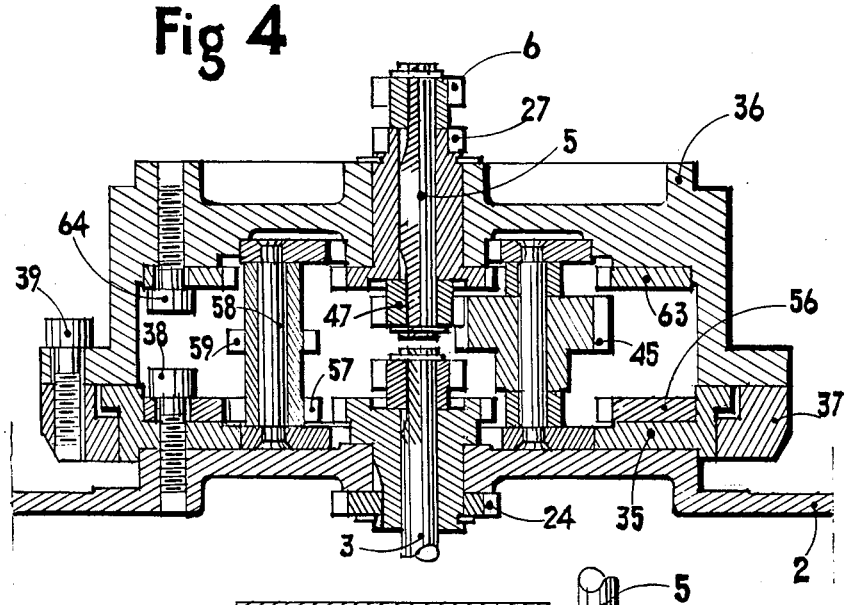
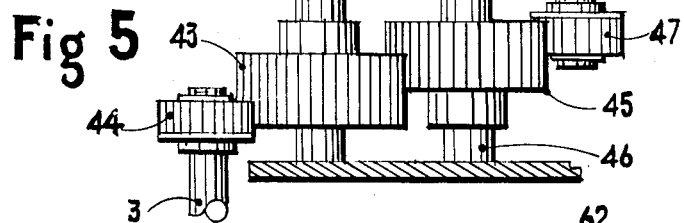
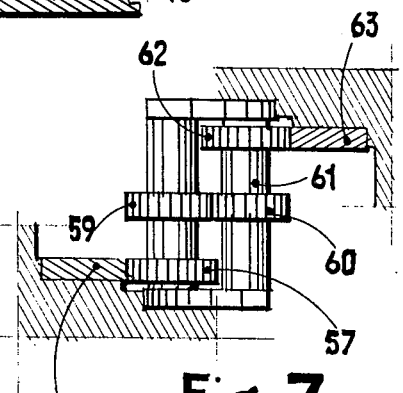
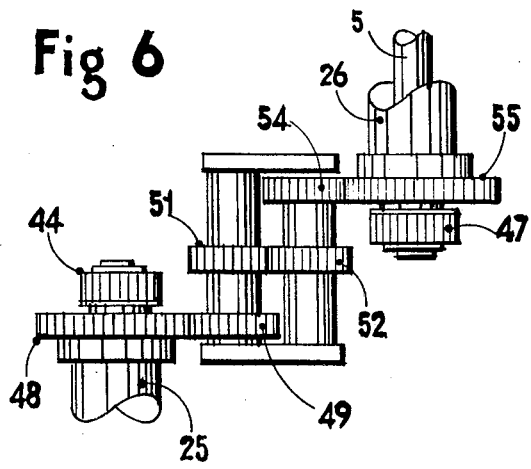

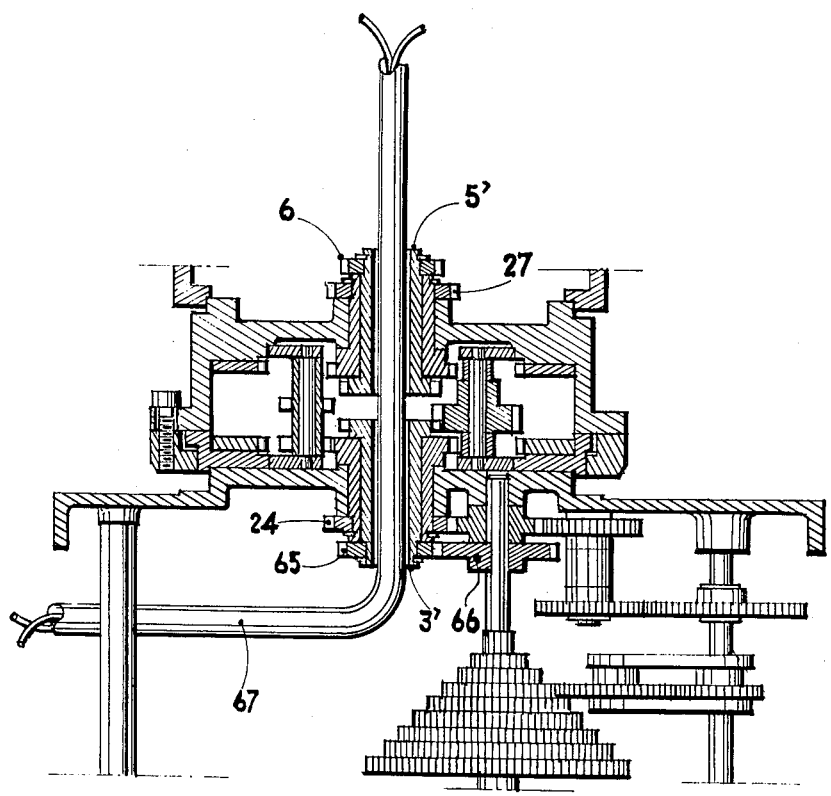

United States Patent Office

3,197,134
Patented July 27, 1965

3,197,134
TRANSMISSION MECHANISM AND
ITS APPLICATIONS
Henri Boutillon, Suresnes, France, assignor to Etablissements Boutillon S.A., Suresnes, Seine, France, a corporation of France
Filed Apr. 24, 1962, Ser. No. 189,792
Claims priority, application France, June 10, 1961, 864,559
6 Claims. (Cl. 235—61)

The present invention relates to transmission mechanisms of the type employed for operatively connecting a driving device, such as a measuring device, to a receiving device, such as an indicator, meter or register, and which is such that this receiving device can be orientated as desired even during its operation without said operation being affected.

Known devices of this type permit transmitting to the orientatable receiver only a single speed.

The object of the invention is to provide a transmission mechanism of this type which is improved in that it comprises two transmission devices which permit transmitting from the same driving device two distinct speeds to two parts of an orientatable receiving device, and means for compensating in said two transmissions the orientating rotation of the whole of said receiving device.

In one embodiment of the invention, the mechanism comprises in combination three coaxial differentials, a first differential being interposed between said driving shaft which is central and transmits one of the rotations and one of the parts of the receiving device to be driven, a second differential being interposed between a tubular shaft coaxial with the driving shaft and the second part of the receiving device to be driven and a third differential being interposed between a fixed support and a housing or other orientatable support for the receiving device.

According to another feature of the invention, the three differentials have a common planet gear carrying cage.

Another object of the invention is to provide various applications of said transmission mechanism and in particular a price indicating and calculating device in which the receiving head, which indicates by means of two distinct parts the amount supplied and the total price, is driven by the driving shaft of a measuring device through the medium of such a transmission mechanism.

Further features and advantages of the invention will be apparent from the ensuing description, with reference to the accompanying drawings to which the invention is in no way limited.

FIG. 4 is a sectional view taken along line IV—IV of FIG. 3;

FIG. 5 is a developed sectional view taken along line O—V—V¹—O of FIG. 3;

FIG. 6 is a developed sectional view taken along line O—VI—VI¹—O of FIG. 3;

FIG. 7 is a developed sectional view taken along line VII—VII of FIG. 3, and

FIG. 8 is a sectional view of a modification of the invention.

The invention is illustrated as being applied to a price indicating and calculating device of the well-known type described in the French Patent No. 1,033,026 of February 22, 1961 filed by the applicant.

Figure 1:
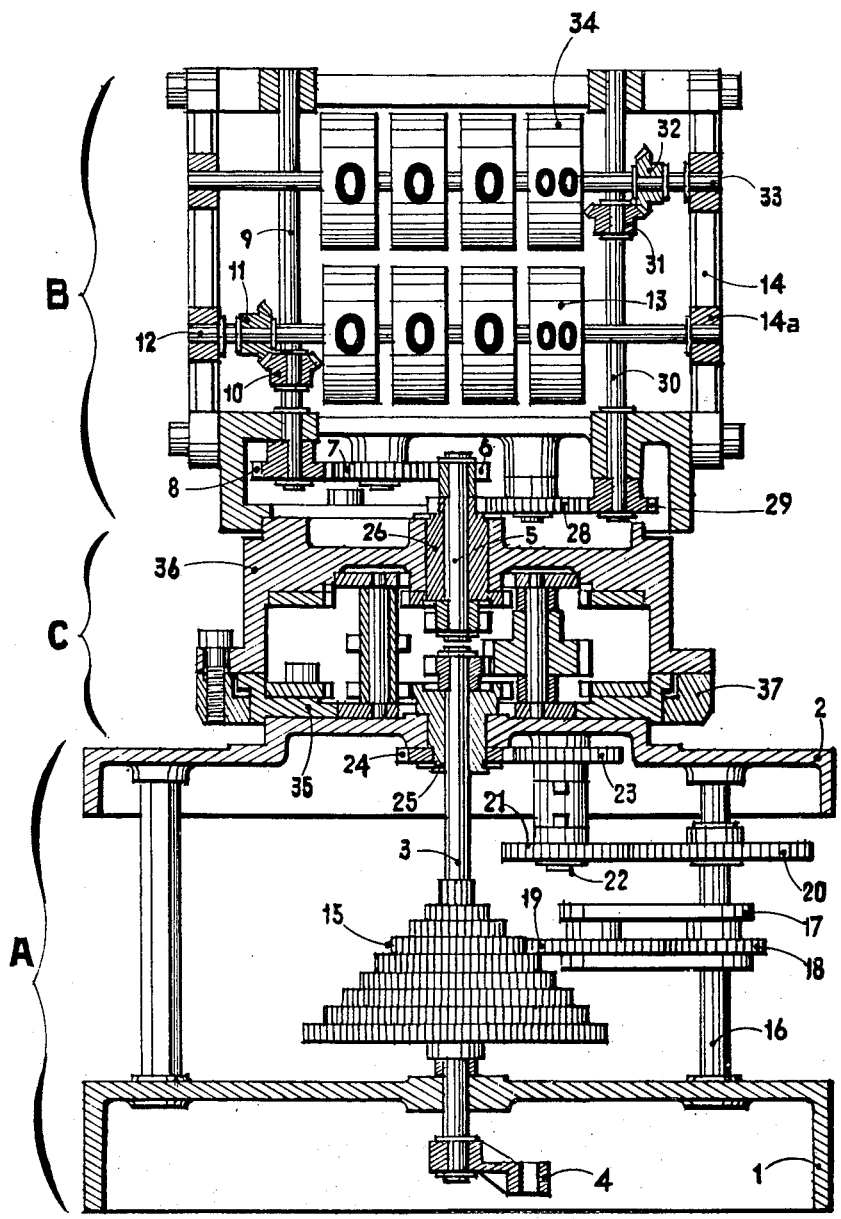
FIG. 1 is a semi-diagrammatic sectional and elevational view of a mechanism according to the invention applied to a price indicating and calculating device.

This indicating and calculating device comprises two main parts (FIG. 1): a variator A whose component parts are driven in rotation by a volumetric liquid measuring device (not shown) and a head B comprising numbered drums which display the amount supplied and the monetary value of this amount.

The transmission mechanism according to the invention is interposed at C between the variator A and the head B.

The moving parts of the variator are mounted between two plates 1 and 2 fixed in space and a central shaft 3 of the variator is driven in rotation by the volumetric measuring device (not shown), for example through the medium of the crank 4.

The rotation of this central shaft 3 is transmitted by the mechanism C, in the manner described hereinafter, to an output shaft 5 situated in the extension of the shaft 3. The shaft 5 carries at its upper end a gear 6 which meshes with an idler gear 7 which meshes with a gear 8 keyed on a vertical shaft 9. The latter carries a bevel gear 10 which meshes with a second bevel gear 11 keyed on a horizontal shaft 12 which drives numbered drums 13 indicating the amount supplied.

The shafts 9 and 12 are of course journalled in bearings, such as 14a, carried by the chassis 14 of the head B.

In the variator A, the shaft 3 carries a coaxial series 15 of stepped gear wheels which are rigid with each other as concerns rotation. A shaft 16 parallel with the shaft 3 and journalled in bearings carried by the plates 1 and 2 carries a shifting element 17 capable of pivoting about and sliding along the shaft 16. In the shifting element 17 a gear 18, keyed on the shaft 17 so as to be rigid with the latter as concerns rotation but slidable therealong, meshes with another gear 19 which can be meshed with any one of the gear wheels 18 by suitably rotating and sliding the shifting element 17. Thus the shaft 16 is driven in rotation at a speed which has a variable speed ratio with respect to the shaft 3, this ratio being varied in steps. The shaft 16 also carries, keyed thereto, a gear 20 which meshes with a gear 21 freely rotative on a fixed shaft 22 mounted on the plate 2. A gear 23 rigid with the gear 21 meshes with a gear 24 rigid with a sleeve 25 which is freely rotative on the shaft 3.

Thus this sleeve 25 is driven in rotation at a speed which is different from that of the shaft 3, this rotation being transmitted by the mechanism C to an output sleeve 26. The latter rotates about the shaft 5 and carries teeth 27 which mesh with an idler gear 28 which meshes with a gear 29 keyed on a vertical shaft 30. The latter is connected by bevel gears 31, 32 to a horizontal shaft 33 which drives numbered drums 34 indicating the monetary value proportional to the amount supplied.

Figure 2:
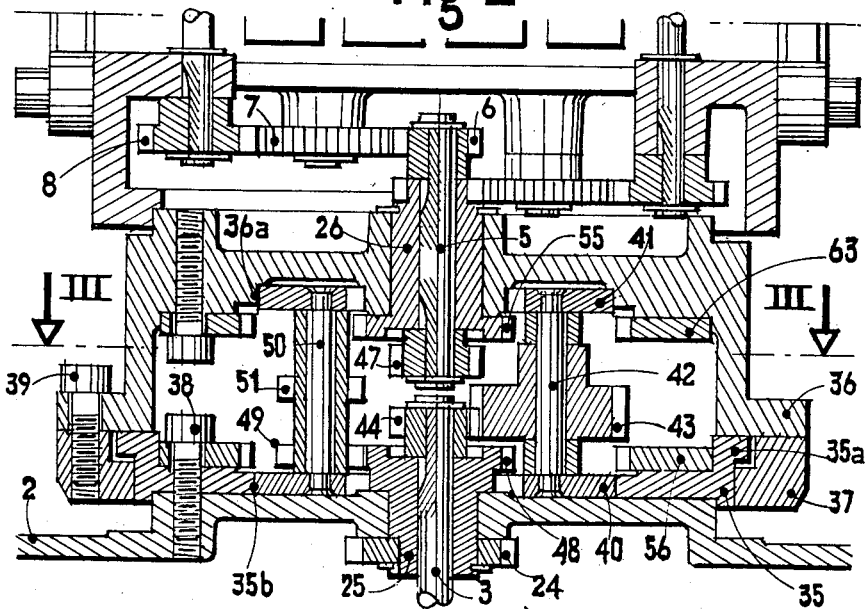
FIG. 2 is a sectional view taken along line II—II of FIG. 3.
Figure 3:
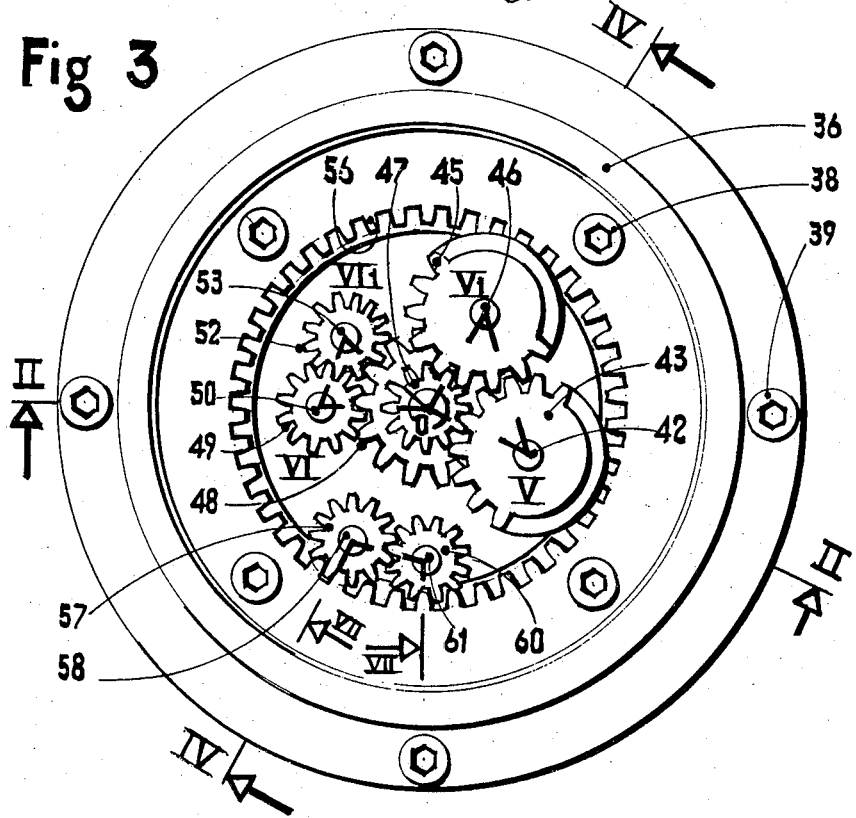
FIG. 3 is a sectional view taken along line III—III of FIG. 2.

The mechanism C according to the invention is located in a housing having three parts: a base 35, a cap 36 and a ring 37. The circular base 35 is secured to the plate 2 by screws 38 (FIG. 2). It has a flange 35a on which the cap 36 rests. The ring 37 matches the shape of the flange 35a with provision of a slight clearance and is secured to the cap 36 by screws 39, so that the cap 36 and the ring 37 are rotatable as a unit about the base 35 with the head B which is secured to the cap 36 by screws (not shown).

A planet gear carrying cage, constituted by two rings 40 and 41 interconnected by shafts 42, 46 . . . acting as spacer members, is freely rotative in the housing (35—36—37) owing to a recess 36a formed in the cap 36 and in which the ring 41 rotates and owing to a similar recess 35b formed in the base 35 and in which the ring 40 rotates.

A planet gear 43 freely rotates on a shaft 42 and meshes with a central or sun gear 44 keyed on the shaft 31, and another gear 45 freely rotates on a shaft 46 and meshes with the gear 43 without meshing with the gear 44 (since it is vertically offset to this end), but meshes with a second central or sun gear 47 keyed on the shaft 5 (FIGS. 2–5). The planet gears 43 and 45 have an identical number of teeth and the sun or central gears 44 and 47 also have an identical number of teeth.

This assembly constitutes a first differential having spur gears. A second differential having spur gears is constituted in a similar manner by toothing 48 formed on the sleeve 25 (FIGS. 2, 3 and 6), a planet gear 49 freely rotative on a shaft 50 and meshing with the teeth 48, second toothing 51 formed on the gear 49, a second planet gear 52 rotating on a shaft 53 and meshing with the toothing 51, second toothing 54 rigid with the gear 52 and toothing 55 formed on the output sleeve 26 coaxial with the shaft 5.

A third differential having spur gears is constituted by the following elements (FIGS. 3, 4 and 7): a ring gear 56 fixed to the base 35 by screws 38, a first planet gear 57 rotative on a shaft 58, second toothing 59 on the gear 57, a second planet gear 60 rotative on a shaft 61 and second toothing 62 rigid with the gear 60 and meshing with a ring gear 63 fixed by screws, such as 64, to the cap 36 on which the head B is also fixed, as explained hereinbefore.

The six shafts 42, 46, 50, 53, 58 and 61 are mounted on the two rings 40 and 41 so as to form the planet gear carrying cage.

The mechanism just described operates in the following manner:

The first differential, formed by the gears 44, 43, 45 and 47, transmits the rotation of the input shaft 3 to the output shaft 5 at the same speed but in the opposite direction (in accordance with the well-known property of spur gear differentials having equal gears) and drives the numbered drums 13 through the medium of the gear train 6, 7, 8, 10, 11.

The second differential formed by the gears 48, 49, 51, 52, 54 and 55, transmits the rotation of the input sleeve 25 to the output sleeve 26 at the same speed and in the opposite direction and drives the numbered drums 34 through the medium of the gear train 27, 28, 29, 31 and 32.

The third differential, formed by the ring gear 56, the gears 57, 59, 60, 62 and the ring gear 63, permits orientating in any manner, whether the machine is inoperative or operative, the head B without affecting the transmission of the two rotations to the numbered drums 13 and 34. This is possible owing to the fact that if the head B is rotated through any angle $x$ about the vertical central shaft, the ring gear 63 rotates with the cap 36 rigid with the head through the same angle $x$, but as the ring gear 56 is fixed in position, the planet gear carrying cage rotates through an angle $x/2$ in the same direction and the output gears 47 and 55 rotate through an angle $x/2 \times 2 = x$ in accordance with the well-known properties of differentials. Thus, as the head and the two output gears have rotated through the same angle in the same direction no relative angular movement occurs between these three elements and no parasite rotation is added to or subtracted from the two effective rotations transmitted by the mechanism.

In the modification of the invention shown in FIG. 8, the shaft 3 is replaced by a tubular shaft 3′ and it carries a gear 65 driven by a gear 66. The shaft 5 is also replaced by a tubular shaft 5′ and this arrangement permits passing through these two tubular shafts a fixed tube 67 containing the electric conductors supplying current to, for example, means illuminating the numbered drums.

Although specific embodiments of the invention have been described, many modifications and changes may be made therein without departing from the scope of the invention as defined in the appended claims.

Having now described my invention what I claim as new and desire to secure by Letters Patent is:

1. A transmission mechanism for operatively connecting a driving shaft to a first driven shaft and to a second driven shaft, the driving shaft being mounted in a support and the driven shafts being mounted in a head, and the three shafts, the head and the support being rotative relative to one another about a single axis, said transmission mechanism comprising: a driving gear coaxial with the driving shaft and rotative relative to the driving shaft, gearing operatively connecting the driving shaft to the driving gear, a first differential operatively connecting the driving shaft to the first driven shaft, a second differential operatively connecting the driving gear to the second driven shaft, and a third differential operatively connecting the head to the support; each differential comprising an input gear and an output gear having the same pitch diameter as the input gear, a member freely rotative about the axis of rotation of the input gear and output gear and two meshed gear pinions of equal pitch diameter rotatively mounted on the member and interconnecting the input gear and output gear; said members of the three differentials being operatively interconnected so that said members rotate together about said single axis, whereby the head can be rotated relative to the support while the driving shaft drives the driven shafts without this affecting the drive ratio between the driving shaft and the driven shafts.

2. A transmission mechansm as claimed in claim 1, wherein said members of the three differentials are combined in a single element rotative about said single axis.

3. A transmission mechanism for operatively connecting a driving shaft to a first driven shaft and to a second driven shaft, the driving shaft being mounted in a support and the driven shafts being mounted in a head, and the three shafts, the head and the support being rotative relative to one another about a single axis, said transmission mechanism comprising: a driving gear coaxial with the driving shaft and rotative relative to the driving shaft, gearing operatively connecting the driving shaft to the driving gear, a first differential operatively connecting the driving shaft to the first driven shaft, a second differential operatively connecting the driving gear to the second driven shaft, and a third differential operatively connecting the head to the support; each differential comprising an input gear and an output gear having the same pitch diameter as the input gear, a member freely rotative about the axis of rotation of the input gear and output gear and two meshed gear pinions of equal pitch diameter rotatively mounted on the member and interconnecting the input gear and output gear; said members of the three differentials being united and forming part of a cage structure rotative about said single axis, whereby the head can be rotated relative to the support while the driving shaft drives the driven shafts without this affecting the drive ratio between the driving shaft and the driven shafts, said cage structure comprising two coaxial rings and shafts interconnecting the rings, the gear pinions of the three differentials being rotatively mounted on the shafts.

4. In a price indicating and counting device, the structure comprising a support having an axis, a head assembly mounted on the support for rotation about said axis, a price indicator and a quantity indicator mounted in the head assembly, a first hollow driven shaft rotatively mounted in the head assembly and operatively connected to the price indicator for driving the latter, a second driven shaft rotatively mounted in the first driven shaft and operatively connected to the quantity indicator for driving the quantity indicator, a first hollow driving shaft rotatively mounted in the support, a second driving shaft rotatively mounted in the first driving shaft, and adapted to be driven by the means measuring the material whose quantity and price are to be indicated, gearing operatively connecting the second driving shaft to the first driving shaft, all the shafts being in axial alignment on said axis, a first differential operatively connecting the first driving shaft to the first driven shaft, a second differential operatively connecting the second driving shaft to the second driven shaft, a third differential operatively connecting the support to the head assembly; each differential comprising a driving gear and a driven gear having the same pitch diameter as the driving gear, a carrier freely rotative about the axes of rotation of the driving and driven gears and two gear pinions of equal pitch diameter rotatively mounted on the carrier and interconnecting the driving gear and driven gear; said carriers of the three differentials being interconnected and mounted in the head assembly to rotate together about said axis of the support whereby the head assembly can be rotated relative to the support while the driving shafts drive the driven shafts without this affecting the drive ratios between the driving shafts and driven shafts.

5. In a price indicating and counting device, the structure comprising a support having an axis, a head assembly mounted on the support for rotation about said axis, a price indicator and a quantity indicator mounted in the head assembly, a first hollow driven shaft rotatively mounted in the head assembly and operatively connected to the price indicator for driving the latter, a second driven shaft rotatively mounted in the first driven shaft and operatively connected to the quantity indicator for driving the quantity indicator, a first hollow driving shaft rotatively mounted in the support, a second driving shaft rotatively mounted in the first driving shaft, and adapted to be driven by the means measuring the material whose quantity and price are to be indicated, gearing operatively connecting the second driving shaft to the first driving shaft, all the shafts being in axial alignment on said axis, a first differential operatively connecting the first driving shaft to the first driven shaft, a second differential operatively connecting the second driving shaft to the second driven shaft, a third differential operatively connecting the support to the head assembly; each differential comprising a driving gear and a driven gear having the same pitch diameter as the driving gear, a carrier freely rotative about the axes of rotation of the driving and driven gears and two gear pinions of equal pitch diameter rotatively mounted on the carrier and interconnecting the driving gear and driven gear; said carriers of the three differentials being united in the form of a cage including spindles on which said gear pinions are mounted, said cage being mounted in the head assembly to be freely rotative relative to the head assembly and support, whereby the head can be rotated relative to the support, even while the driving shafts drive the driven shafts, without this affecting the drive ratios between the driving shafts and driven shafts.

6. The structure as claimed in claim 5, wherein said second driving shaft and said second driven shaft are hollow shafts, the structure further comprising a tubular element extending through the second driving shaft and said second driven shaft, electric illuminating means supported by the head assembly for illuminating the price indicator and the quantity indicator, and electric conductors connected to the illuminating means and extending through the tubular element for connection to a source of current.

References Cited by the Examiner
UNITED STATES PATENTS

| | | | |
|---|---|---|---|
| 714,823 | 12/02 | Samain | 235—94 |
| 1,563,769 | 12/25 | Marden | 235—94 |
| 2,111,996 | 3/38 | Slye | 74—681 |
| 2,137,013 | 11/38 | Bradley | 235—132 |
| 2,521,771 | 9/50 | Bechle | 74—681 |
| 2,600,562 | 6/52 | Meyer | 74—681 |
| 2,770,711 | 11/56 | Baranowski | 240—2.1 |
| 2,855,149 | 10/58 | Bickford et al. | 235—23 |
| 2,986,332 | 5/61 | Young | 235—23 |
| 3,047,220 | 7/62 | George | 235—61 |
| 3,122,312 | 2/64 | Daniele | 235—61 |

LEO SMILOW, *Primary Examiner.*